United States Patent Office 3,341,320
Patented Sept. 12, 1967

3,341,320
PRODUCTION OF LOW PARTICLE SIZE-HIGH SURFACE AREA METAL POWDERS
Seymour H. Smiley, Oak Ridge, Tenn., assignor to the United States of America as represented by the United States Atomic Energy Commission
Filed Apr. 5, 1966, Ser. No. 547,689
6 Claims. (Cl. 75—.5)

ABSTRACT OF THE DISCLOSURE

Volatile metal fluorides are reduced to elemental metal powder by separately feeding a volatile metal fluoride in a carrier gas selected from hydrogen and fluorine and the non-selected carrier gas into a nozzle and surrounding annulus arrangement to form a hydrogen-fluorine flame to initiate and sustain conversion of the metal fluoride to powder.

---

The invention described herein was made in the course of, or under a contract with the U.S. Atomic Energy Commission.

This application is a continuation-in-part of my copending application Ser. No. 380,721, filed July 6, 1964, now abandoned. The present invention relates to a process for the production of irregular-shaped, extremely pure, micron and submicron size metal powders having an unusually high surface area. More particularly, the process relates to production of such powders from the hydrogen reducible fluorides of a metal selected from Groups IIIb, IVa, Va, VIa, VIIa, and VIII of the Periodic Table with reference to the Periodic Table shown on page 1821 of Webster's New International Unabridged Dictionary, Second Edition (1947).

It is an object of this invention to produce a powder from the aforementioned selected metal fluorides wherein said powder is characterized by its extremely high purity, irregular-shape, fine particle size and unusually high surface area. A particular object of this invention is to produce a metal powder having enhanced sinterability in terms of reaching a desired sintered density under comparable conditions of time and/or temperature, and/or pressure in comparison to other sinterable powders having about the same particle size and/or particle size distribution. A further object is to provide a process which enables the attainment of the aforesaid objects. Still another object is to provide a process for producing a metal powder on a continuous basis. A further object is to provide a process for producing a metal or alloy powder whose physical characteristics are determined by simple and controllable process parameters, rather than the prior fabrication history of its precursor material or source.

Summary of the invention

The process of this invention is carried out by separately introducing two gas streams consisting of (a) a volatile metal fluoride, of the class described, in a carrier gas selected from hydrogen and fluorine and (b) a gas selected from hydrogen and fluorine, into a central nozzle and concentric surrounding annulus nozzle arrangement within a reaction zone under such conditions as to cause at least a part of the hydrogen and fluorine to ignite, thus initiating and sustaining the reaction between the metal fluoride and hydrogen, and thereafter collecting the resultant metal powder and withdrawing the resultant gases from said reaction zone.

As just noted, this invention utilizes the heat of reaction between hydrogen and a halogen gas, preferably fluorine, to initiate and sustain the reaction involved in converting the selected metal fluoride directly, and on a virtually instantaneous and continuous basis, to a powder product whose unique combination of qualities will be discretely defined in the ensuing description.

Figure 1:
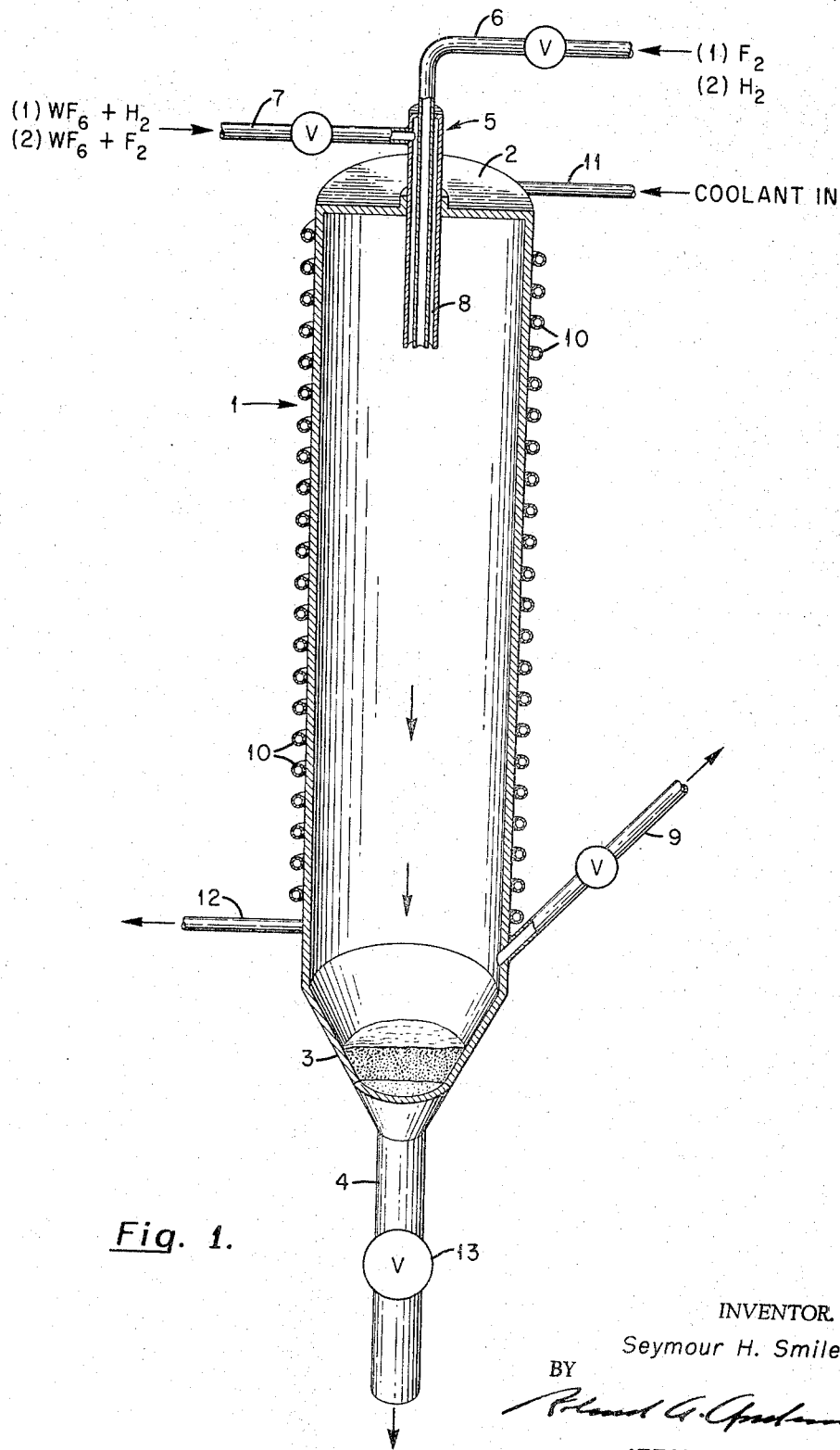

The process is carried out in a simple apparatus as represented typically in FIG. 1, which shows an elongated metal cylindrical chamber 1 having a top end face 2 and a sloped, cone-shaped bottom area 3 which is connected to an outlet 4. Extending through the top end of the cylinder is a gas entry assembly 5 consisting of two concentrically disposed tubes 6 and 7, the outer surface of tube 6 and the inner surface of tube 7 defining an annulus 8; the nozzle of tube 6 and of annulus 8 providing feed points for the gaseous reactants entering the reactor chamber volume. A gas outlet line 9 is provided near the bottom of the reactor above the cone-shaped area to which excess hydrogen and by-product HF gas are vented. In use, a metal filter is inserted into exit line 9 to trap entrained particles. Heat removal and control is provided by a cooling system consisting of a metal coil 10 welded to the straight wall portion of the cylinder in which a coolant, such as steam, is passed therethrough from entry port 11 and leaving through port 12. Immediately, the hydrogen and fluorine pass the nozzles of the respective gas entry tubes, ignition occurs and the volatilized metal fluoride entering the thus produced flame area is converted to a fine spray of the elemental metal powder. The powder settles into the sloping cone-wall section of the reactor, where it accumulates and is periodically removed through valve 13 in line 4. The by-product gas, as mentioned, consisting of hydrogen fluoride and hydrogen leave through exit line 9. The design of the off-gas filtering system permits "blowback" so that entrained solids that have been removed can be transferred to the single product take-off point below the reactor.

The conversion of tungsten hexafluoride, using the hydrogen-fluorine flame to initiate and sustain the reaction of the hexafluoride with hydrogen, is virtually an instantaneous and quantitative reaction. The quantitative nature of the reaction is evidenced by the fact that analysis of the off-stream gas issuing from side arm 9 has revealed no detectable level of tungsten hexafluoride so long as a stoichiometric excess of flow of hydrogen is maintained through the reactor, where the stoichiometry involved is determined by the following equation,

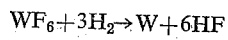

$$WF_6 + 3H_2 \rightarrow W + 6HF$$

Similar equations may be written to represent the reaction stoichiometry involved in the conversion of the other selected metal halide reactants.

The controlling parameters of the process are defined by the gas entry conditions and the reactor wall temperature. The reactor wall temperature presents no particular problem. It can be maintained within a wide range of temperature over a wide range of gas entry conditions without affecting the operability of the process. In general, the reactor wall temperature is easily maintained at a temperature in the range 250–1000° F. to ensure production of a useful tungsten powder product without causing undue corrosion of the reactor wall with resulting contamination of the product. In this connection, it should be noted that the formation of an adherent tungsten film deposit on the internal wall of the reactor cannot be avoided, but the formation of such film is actually advantageous in the sense that it provides an effective tungsten envelope for the ultra-fine tungsten powder product thus reducing, if not entirely eliminating, the possibility of metallic contamination from the reactor wall materials. The reactor vessel may be composed of nickel or Monel.

While some deposition of tungsten powder on the reactor wall is acceptable, an excess deposition of powder should be avoided since efficiency, in terms of producing a powder of the desired quality and quantity, is considerably reduced because the wall-deposited powder agglomerates to form rather large crystalline aggregates. The aggregrates are soon dislodged from the reactor wall and become admixed with the desired ultra-fine tungsten powder product. A secondary source of agglomerate or aggregrate formation occurs in the flame area. Of course, these aggregates can be subsequently separated and recovered by suitable sizing operations, but it is preferred that aggregate formation be reduced to a minimum.

While this is not an over-riding problem, an initial preclassification of the product can be achieved by the use of an H-shaped reactor rather than the one shown in FIG. 1. The H-reactor would simply consist of two vessels of the same general shape, as the one in FIG. 1, joined by a horizontal side arm. In one of the reactors, the actual conversion of the metal halide would take place in accordance with the previously stipulated gas entry conditions. This first reactor would then have a horizontal take-off line which is connected to the second vessel containing a sintered metal filter tube. By suitable flow conditions, the fine powder produced in the first vessel would flow through the side arm into the second vessel where the solids are filtered and "blown back" to a separate product receiver while the large undesirable aggregates, having a higher density, would simply fall into the bottom of the first vessel. The aggregates which drop to the bottom of the first reactor of the H-type arrangement can be readily fluorinated and recycled. For some applications, grinding or wet screening is sufficient to permit use of much of the material that falls into the first vessel receiver.

The principal controlling parameter, in terms of producing a powder of the desired particle size or particle size distribution and surface area, is determined by the gas entry conditions, in all cases assuming a stoichiometric excess flow of hydrogen. Where hydrogen is used as the carrier gas for the metal halide, and is introduced through nozzle annulus 8, and fluorine is flowed through the central nozzle, then the particle size, as measured by micromerograph analysis at the 50% level, will run from 1 to 1.6 microns with an average crystallite size, as measured by X-ray diffraction analysis, running less than 1000 angstroms. This powder is non-pyrophoric and will have a surface area running from approximately 1.5 to 6.5 square meters/gram.

Where fluorine is used as the carrier gas for the volatile metal halide, said mixture being charged through the central tube with hydrogen passing through the annulus nozzle, the product powder exhibits an unusually low particle size and an extremely high surface area. In fact, the particle size is so small as to preclude accurate measurement by micromerograph techniques, but is established from X-ray and surface area measurements to be less than 0.1 micron. The X-ray crystallite size runs less than about 600 angstroms, and the surface area is extraordinarily high, running from 8 to as high as 14 square meters/gram.

The gaseous reactants entering the reactor zone require no pre-heating other than to ensure that the tungsten hexafluoride is in a gaseous state. Neither do they require any special kind of pre-treatment, except that care should be taken to ensure they are free of such contaminants as water vapor and carbon-bearing compounds, such as carbon dioxide, methane and fluorocarbons. The presence of water vapor is undesirable because of the probable formation of tungsten oxyfluoride or other hydrolysis products. Carbon-bearing compounds result in carbon contamination of the metal powder products.

The purity of the powder produced by the process of this invention is at least comparable with the highest purity powder presently available on a commercial basis. Thus, for example, regardless of gas entry conditions, and assuming a reasonably tight control over the purity of the gaseous reactants, the total metallic impurity has rarely been found to exceed 25 parts per million, where the presence of metal impurities was measured by spectrographic analyses for silver, aluminum, calcium, cobalt, chromium, copper, iron, magnesium, manganese, molybdenum, nickel, lead, silicon, tin, vanadium, and zirconium. The non-metallic content will consist of carbon to the extent of about 50 parts per million, and fluorine which is present to no more than about 300 parts per million. The carbon level can be reduced to much lower levels by careful control of the purity of the feed gases. The concentration of all of these non-metals, particularly fluoride, can be considerably reduced by treatment of the resultant powder in a hydrogen atmosphere at a temperature in the range 540° C. to 815° C. for a period of about 8 to 24 hours, without adversely affecting the desirable physical characteristics of the powder. Furthermore, where the powder is fabricated by sintering at a temperature of 2380° C., the fluoride level is reduced to 2 parts per million or less with concomitant reduction of carbon.

Figure 2:
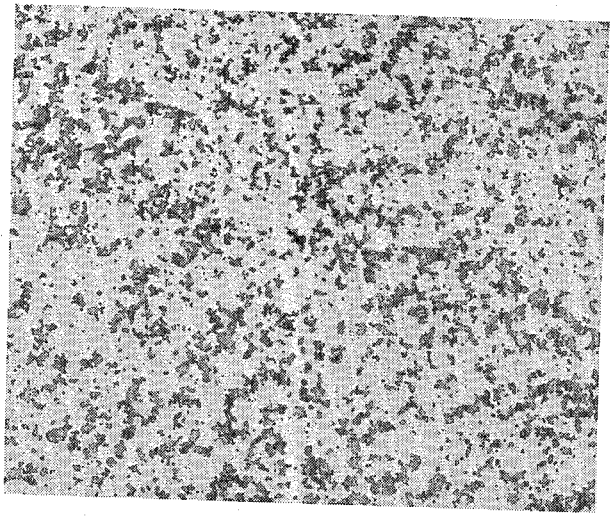

An indication of the shape of the particles produced by the process of this invention may be gleamed from FIG. 2, which is a shadowgraph of such particles at a 500-fold magnification level. It will be seen that the shape of the particles is generally irregular with no specific form or orientation—a form which is thought to be highly desirable in terms of enhanced sintering qualities of the metal powders.

Having described the process and product aspects of this invention in general terms, the following examples are presented as specific embodiments which are designed to illustrate the efficiency of the process as well as the unusually unique combination of qualities of the products produced by the process.

*Example I*

This example illustrates the applicability of the process to the production of tungsten powder using tungsten hexafluoride as the source of tungsten wherein the process was conducted under the gas entry conditions previously discussed.

In order to form a non-pyrophoric powder, hydrogen was employed as the carrier gas for the tungsten hexafluoride entering the reactor, as shown in FIG. 1, through the nozzle annulus with fluorine gas passing through the central tube nozzle.

In order to produce a pyrophoric powder, fluorine was used as the carrier gas for the tungsten hexafluoride, and the fluorine-tungsten hexafluoride mixture was charged through the central tube nozzle with hydrogen gas passing through the annulus nozzle. It should be understood that in all cases the process was conducted using an excess of hydrogen with respect to the stoichiometric requirement. These two modes of carrying out the process of this invention were conducted over a wide range of conditions by varying such factors as feed rate, reactor wall temperature, gas velocities, etc. Table I below represents a summary of the process parameters which were varied within the limits indicated, in order to produce the two grades of metal powder. The table also characterizes the product powder in terms of size, density, surface area and purity.

TABLE I

| | Non-Pyrophoric Powder (Carrier Gas is $H_2$) | Pyrophoric Powder (Carrier Gas is $F_2$) |
|---|---|---|
| Feed Rate of $WF_6$ (lb./hr.) | 0.71–24 | 7.5–11.4 |
| $F/WF_6$ Weight Ratio | 0.07–0.71 | 0.14–0.22 |
| Amount of $H_2$ Flow (stoichiometric excess) | 300–400 | 300–600 |
| $H_2$ Input Flow (cubic feet/minute) | 2.3–3.0 | 3 |
| $F_2$ Input Flow (cubic feet/minute) | 0.17–0.26 | 0.17–0.26 |
| Wall Temperature, ° F | 300–950 | 300–950 |
| Tapped Density (g./cm.³) | 0.5–2.8 | Not measured |
| Free Flow Density (g./cm.³) | 0.4–1.9 | Not measured |
| Particle Size, Microns by Micromerograph (50% size) | 1–1.6 | [1] 0.01–0.1 |
| X-Ray Crystallite Size, A | ~1,000 | <600 |
| Surface Area (sq. meters/gram) | 1.6–6.3 | 8–14 |
| Purity (Total Metallic Impurity in p.p.m.) | <25 | <25 |

[1] Not measured but estimated only.

From a consideration of the process and product parameters as given in the table, it can be seen that the characteristics of the powder produced under given gas entry conditions remain substantially within discrete limits over a wide range of fluorine and tungsten hexafluoride input feed rates and over a wide range of reactor wall temperature. The reactor wall temperatures are easily controlled and the characteristics of the powder product are essentially unaffected at reactor wall temperature, running from 300 to as much as 950° F. Where the carrier gas was fluorine, the powder was of such small size as to make measurement by micromerograph techniques unreliable.

The surface area of the product produced when fluorine was used as the carrier gas was much higher in comparison with the surface area of the product obtained when hydrogen was the carrier gas. In general, the surface area of the product will be increased when the hydrogen input flow is increased above 3 cubic feet per minute regardless of the concentric tube gas entry arrangement. Shadowgraphs of the pyrophoric and non-pyrophoric powder taken at a 500-fold magnification indicated that the shape of both classes of powder was highly irregular as typified by the shadowgraph shown in FIG. 2.

At this point, it should be noted that the process of this invention is not limited to the specific gas entry conditions previously discussed where the carrier gas may be fluorine or hydrogen—for it is within the scope of this invention to include gas entry conditions in the concentric tube nozzle arrangement, wherein the volatile metal halide is carried by both carrier gases. Thus, in a so-called "split" run, where 67% (by volume) of the tungsten hexafluoride was carried by fluorine passing through the central tube nozzle and 23% of the tungsten hexafluoride was carried by the hydrogen passing through the annulus nozzle, a product having a particle size in the range 1.2 to 1.6 microns was produced with a surface area of 7.4 square centimeters/gram. Here, the surface area was intermediate between the two classes of powder designated in Table I as pyrophoric vs. non-pyrophoric.

*Example II*

In an apparatus similar to that shown in FIG. 1, a mixture of gaseous molybdenum hexafluoride and hydrogen was passed through the annulus nozzle with fluorine passing through the central tube nozzle. In several runs using this gas entry arrangement, the conditions were varied as follows:

Reactor wall temperature, ° F. _____ 600–1000
Hydrogen stoichiometric excess, percent _____ 200–450
Molybdenum hexafluoride feed rate in lbs./hr. _____ 5.5–6.5
Fluorine/molybdenum hexafluoride molar ratio _____ 0.15:0.25

Under these conditions, a molybdenum powder having the following characteristics was obtained:

Average particle size in microns (micromerograph 50% level) _____ 1.1–2.4
X-ray crystallite size in angstroms _____ >1000
Flow density in grams/cc. _____ 0.5–0.9
Packed density in grams/cc. _____ 0.6–1.0
Total metallic impurities in parts per million__ 25
Carbon (parts per million)_____ <50
Fluoride percent by weight _____ 0.05–0.48
Surface area (sq. meters/gram)_____ 6.0

Microscopic examination of the powders under the process conditions described showed the particles to be highly irregular in shape. As in the previous case, the fluoride content can be reduced without any significant change in particle size and/or surface area by hydrogen reduction.

*Example III*

The prior description and examples have illustrated the applicability of the process of this invention to the production of metal powders, having an extraordinary combination of size, shape, surface area and purity. However, the process is not limited to the production of elemental powders, but finds applicability in the formation of alloy powders having the same desirable combination of physical properties. For example, a tungsten-molybdenum alloy powder can be produced under conditions similar to the formation of tungsten powder and molybdenum powder by using tungsten hexafluoride and molybdenum hexafluoride as the initial reactants, either as a mixture and/or carried by either fluorine and/or hydrogen under the gas entry conditions described. Alternatively, these reactants may be mixed with both carrier gases, and in each case, a tungsten-molybdenum alloy will be formed whose composition will be determined by the quantity and flow rates of these respective reactants into the nozzle tube arrangement. Thus, in one exemplary embodiment, a run was conducted at a reactor shell temperature of 950–1000° F., a $MoF_6$ rate of 2.5 pounds per hour, a $WF_6$ rate of 12 pounds per hour, a fluorine rate of 1.7 pounds per hour, and a hydrogen excess of 150% of stoichiometric. The $WF_6$ and $MoF_6$ were pre-mixed with $H_2$ before introduction into the reactor through the annulus 8 of the concentric nozzle arrangement. Fluorine was fed through the central nozzle. The resultant powder was subjected to X-ray diffraction analysis. The X-ray diffraction curve showed a single diffraction pattern instead of two distinct molybdenum and tungsten crystalline phases, thus establishing the existence of an alloy. The lattice spacing corresponds to a tungsten-base alloy containing 15% molybdenum. Surface area of the powder was 3.6 square meters/gram; the average particle size by micromerograph was 1.6 microns, and the X-ray crystallite size was 800 angstroms. Bulk and packed densities were 0.5 and 0.7 gram/cubic centimeters, respectively.

*Example IV*

A tungsten-base alloy powder containing 25 weight percent rhenium was produced in an apparatus similar to the one shown in FIG. 1. Operating conditions and results for typical pilot plant reduction runs are shown in Table II below. Runs were made with mixtures of tungsten hexafluoride and rhenium hexafluoride by flash evaporizing the mixtures and introducing same either through the nozzle annulus with hydrogen as the carrier gas (as in runs 1–5) or through the center pipe with fluorine as the carrier gas (as in runs 6 and 7). As with tungsten powder production, alloy powders produced by using $F_2$ as the carrier gas for the hexafluoride vapor had a higher surface area than runs where hydrogen was the carrier gas.

TABLE II.—TUNGSTEN-25% RHENIUM ALLOY POWDER RESULTS OF FLAME REDUCTION RUNS

| Run No. | Hex [1] Fed With | Hex [1] Rate, lb./hr. | Lb. F$_2$ per lb. Hex | H$_2$ Excess, percent | Surface Area, sq.m./g. | Mean Diameter, microns | Crystallite Size, A. |
|---|---|---|---|---|---|---|---|
| 1 | H$_2$ | 3.0 | 0.56 | 1,400 | [2] 7.3 | 1.6 | 320 |
| 2 | H$_2$ | 3.9 | 0.44 | 1,050 | 5.9 | 1.1 | |
| 3 | H$_2$ | 4.0 | 0.42 | 1,030 | 5.2 | 1.1 | 220 |
| 4 | H$_2$ | 9.2 | 0.11 | 400 | 6.0 | 0.9 | 420 |
| 5 | H$_2$ | 1.4 | 2.86 | 2,700 | 8.0 | 2.4 | 350 |
| 6 | F$_2$ | 8.3 | 0.12 | 470 | 11.6 | 2.4 | 360 |
| 7 | F$_2$ | 7.9 | 0.22 | 500 | | | |

[1] Hex denotes mixture of WF$_6$+ReF$_6$ in proportions sufficient to yield a W-25 w/o Re alloy powder.
[2] The product is pyrophoric.

X-ray diffraction analysis of the resultant powder showed that the primary constituent was tungsten-rhenium solid solution with a lattice parameter of 3.1489 A. which corresponds to a tungsten-22% rhenium solid solution. Calculations based on chemical analyses showed rhenium content slightly higher than that derived by X-ray data.

The fluoride content of the alloy powder as discharged from the reactor was about 5,000 p.p.m., which is ten times greater than the average value for flame-reduced tungsten powder. This surface coating of fluoride permits handling in air, however, and the powder is not pyrophoric. Although the fluoride can be reduced to a few parts per million by treatment with hydrogen for 24 hours at a temperature as low as 550° C., the resulting powder is pyrophoric, and this undesirable characteristic is still evident even when the fluoride removal operation is conducted at a temperature as high as 925° C. The powder reactivity can, however, be reduced by carrying out the hydrogen treatment at still higher temperatures, as shown in Table III. It can be seen that treatment for 2 hours at 1150° C. or 1250° C. resulted in stable powders of low fluoride content with surface areas and particle sizes at the general level desired for powder metallurgy fabrication. Thus, by appropriate heat treatment, fluoride content can be reduced and particle size and surface area of the products can be tailored to match specific requirements. At 1350° C. and above, excessive sintering of the powder was noted.

TABLE III.—HEAT TREATMENT OF TUNGSTEN-25% RHENIUM ALLOY POWDER

| Temperature, °C. | Time, hr. | Fluoride Content, p.p.m. | Surface Area, sq. m./g. | Particle Mean Diameter, microns | Crystallite Size, A. |
|---|---|---|---|---|---|
| 1,150 | 2 | <10 | 1.8 | 1.7 | 910 |
| 1,250 | 2 | <10 | 1.2 | 1.8 | 1,000 |
| 1,350 | 2 | <10 | 0.36 | 10.8 | >1,000 |

Powder compacts of the resultant W-Re alloy powder were sintered for 4 hours at 1800° C. to 97% theoretical density; at 2200° C. a 4-hour sintering cycle increased the density to 98.6% of theoretical. The room temperature tensile strength of the specimen formed from the alloy powder was 150,000 p.s.i., a high value for a tungsten material.

Using the tungsten-rhenium alloy, impervious tubing has been made by standard metallurgical techniques. Using an alloy powder of the subject type as a starting material, alloyed parts can be fabricated utilizing standard powder metallurgy techniques. Considering the fact that high-melting components (components melting at about 3000° C.) are involved, it is a distinct advantage not to have to produce alloys from mixtures for fabrication by arc melting or other high-temperature techniques. The method of this invention is especially advantageous in forming alloy powders containing vanadium, in comparison to arc melting or melt casting techniques where the vanadium has a distinct tendency to volatilize.

*Example V*

This example illustrates the applicability of this invention to the production of ternary alloy systems. A gaseous mixture of tungsten hexafluoride-molybdenum hexafluoride-rhenium hexafluoride together with hydrogen as the carrier gas was flowed through the center pipe of the gas nozzle arrangement shown in FIG. 1, using a hydrogen flow rate of 3 standard feet per minute. The flow rate for the hexafluoride mixture was 6.8 pounds per hour. Fluorine was admitted through the annulus nozzle at a flow rate of 1.7 pounds per hour. The temperature of the reactor wall was maintained at about 900° F. during the run. The powder was collected and analyzed and found to contain (on a weight percent basis) 54% tungsten, 30% rhenium and 16% molybdenum. By controlling the concentration ratio of the respective sintered volatile metal fluorides in the feed mixture, it is clear that an alloy powder of any desired composition may be readily produced.

*Example VI*

This example is designed to illustrate the unique sintering qualities of the powder produced by the method of the present invention. In addition to the high purity and irregular shape, the powders produced by the present invention are uniquely characterized in that the surface area is severalfold greater than the surface areas of commercially available powder of comparable particle size distribution. As far as I am aware, no powder presently available on a commercial scale possesses this unique size-surface area relationship. The unique quality of the powder produced by this invention can be illustrated by a comparison of a typical powder of this invention vs. a powder of the same irregular shape and having a particle size approaching the size of the subject powder, but differing in its size to surface area relationship. Thus, in Table IV below is listed a comparison of the size, surface area, density, and purity of a typical powder produced by the process of this invention, identified as S(1, 2, 3) vs. an irregularly-shaped powder whose particle size was chosen to match the particle size of the powder produced by this invention, identified as M(1, 2, 3) as closely as possible.

TABLE IV

| | Comparison Powder M | Invention Powder S |
|---|---|---|
| Size: | | |
| Micromerograph (50%) | 1.3 | 1.8 |
| X-Ray Crystallite Size (microns) | ~0.1 | ~0.1 |
| Surface Area, meter $^2$/gram | 1.68 | 4.23 |
| Density: | | |
| Tapped | 3.39 | 0.84 |
| Free Flow | 2.21 | 0.62 |
| Chemical Analysis: Total Inorganic Impurity in p.p.m. | 25 | 25 |

The two powders were fabricated in exactly the same manner under three fabrication schemes which differed only in the cold pressure applied to the powder batches. Batches M-1, and S-1 were cold pressed to 16,000 p.s.i. and sintered for 10 minutes under vacuum at a temperature at about 2400° C. The M-2 and S-2 were each cold pressed to 25,000 p.s.i. and sintered under the same conditions; and the M-3 and S-3 batches were pressed to 30,000 p.s.i. and sintered in the same manner. The results are summarized in Table V below.

TABLE V

|     | Cold Pressed (lb./in.$^2$) | Sintered Density (gms./cc.) |
| --- | --- | --- |
| M-1 | 16,000 | 17.68 |
| M-2 | 25,000 | 17.76 |
| M-3 | 30,000 | 17.86 |
| S-1 | 16,000 | 18.00 |
| S-2 | 25,000 | 18.01 |
| S-3 | 30,000 | 17.97 |

It will be seen that the powder produced by the present invention reached a significantly higher attained sintered density under each processing schedule. Thus, comparing the samples pressed at 16,000 p.s.i., and assuming the theoretical density of tungsten to be 19.3 grams per cubic centimeter, it will be seen that the S-1 powder as produced by this invention reached a final attained sintered density of 18.00 grams/cc. This represents 93.3% of the theoretical density of tungsten. This is to be compared with the M powder (which is deemed to most closely approximate the powder size produced by this invention), which reached an attained density of 17.68 grams/cc. which represents only 91% of the theoretical density of tungsten. In short, it will be seen that the sintering quality of powder produced by the present invention is significantly higher than a powder chosen to represent the closest approximation to the physical size of said powder. Thus, the unique size to surface area relationship which characterizes the powder produced by this invention is advantageously reflected in the enhanced sintered density obtainable in comparison to powders which are not so uniquely characterized. Stated in other terms, at a given compacting pressure, the powder of this invention will sinter to higher attained sintered densities in comparison to powders having a similar range of particle size, but outside the size to surface area relationship characterized by the product powder of this invention.

The W powder produced by the process of this invention can be sintered to 100% of theoretical density of W merely by increasing the pressure and/or sintering time. Significant sintered densities may be achieved simply by sintering a volume of W powder at its tap density.

While this example is intended to demonstrate the advantage of the powders of the present invention in providing unusually high sintered compacts, the characteristic properties of the powders which can be produced by this invention may also be employed with an advantage for providing consolidated and/or sintered materials of sound structural integrity having a density substantially lower than the theoretical density of the metal or alloy involved.

In some cases, a powder may be required having a higher average particle size and lower surface area than that characterized by the powder of this invention. In these instances, the powder of this invention may be easily converted to the desired size-surface area required by oxidation and subsequent reduction. Thus, consider a W reference powder of this invention having an average particle size of about 1.5 microns and a surface area of at least 3 meters$^2$/gm. Such a powder can be converted to one having an average particle size of 2–4 microns with a surface area decrease to less than 0.5 square meter per gram by oxidizing the referenced powder in an oxygen atmosphere at 1000° F. for a period of about 4 hours, and then heating in a $H_2$ atmosphere at 1500° F. By controlling the time at temperature in this oxidation-reduction sequence, the reference powder (of this invention) can be changed to meet the requirements of the user.

Unless otherwise noted, all mention of size and size distribution of metal powders is made with reference to a particular mode of measurement by the application of Stokes Law for the velocity of particles falling in gas (nitrogen). In particular, size and size distribution measurements were obtained by the use of Sharples "micromerograph," designating an instrument in which a sample of powder is dispersed and caused to flow downward a sedimentation column containing nitrogen gas. The particles are collected on the pan of a recording balance with a chart plotting weight vs. time. Then, by the application of Stokes Law, one obtains a particle distribution curve. The phrase "micromerograph at the 50% level," or words to that effect, in the present context, means that 50% of the particles have a size (measured in microns) equal to or less than the designated particle size. Surface area of powders recited herein was measured by nitrogen absorption measurements.

Having thus described my invention, I claim:

1. A process for forming a powder from a volatile fluoride of a metal selected from Group IIIb, IVa, Va, VIa, VIIa, and VIII of the Periodic Table which comprises separately introducing gas streams consisting of (a) a volatile metal fluoride of the metal of the selected class in a carrier selected from hydrogen and fluorine and (b) a gas selected from the non-selected carrier gas in (a) into a nozzle and surrounding annulus nozzle arrangement within a reaction zone, reacting said hydrogen and fluorine to cause ignition thereof to form a hydrogen-fluorine flame, collecting the resultant powder issuing from said flame and withdrawing the resulting gases from said reaction zone.

2. A process for forming a powder selected from the group tungsten and molybdenum comprising separately introducing the gas stream consisting of (a) a volatile metal fluoride of the selected metal within a carrier gas selected from hydrogen and fluorine and (b) a gas selected from the non-selected carrier gas in (a) into a nozzle and surrounding annulus nozzle arrangement within a reaction zone, igniting the hydrogen and fluorine issuing from said nozzles to form a flame, collecting the resultant powder issuing from said flame and withdrawing the resulting gases from said reaction zone.

3. A process for forming a powder of at least one metal selected from Group IIIb, IVa, Va, VIa, VIIa and VIII of the Periodic Table which comprises separately introducing (a) a volatile metal fluoride of a metal of the selected class in a carrier gas selected from hydrogen and fluorine and (b) a volatile fluoride of a metal of the selected class in a carrier gas selected from the non-selected carrier in (a) into a nozzle and surrounding annulus within a reaction zone, igniting the hydrogen and fluorine issuing from said nozzles to form a flame, collecting the resultant powder issuing from said flame and withdrawing the unreacted gases and gaseous by-products.

4. A process for forming an alloy powder from a volatile fluoride of a metal selected from Group IIIb, IVa, Va, VIa, VIIa, and VIII of the Periodic Table which comprises separately introducing gas streams consisting of (a) at least one metal fluoride of the metal of the selected class in a carrier gas selected from hydrogen and fluorine and (b) the non-selected carrier gas in (a) into a nozzle and surrounding annulus nozzle arrangement, reacting said hydrogen and fluorine, recovering the resultant alloy powder issuing from said flame, and withdrawing the resultant gas from said reaction zone.

5. The process according to claim 4 in which the volatile fluoride mixture comprises $WF_6$ and $ReF_6$.

6. The process according to claim 4 in which the volatile fluoride mixture comprises $WF_6$, $ReF_6$, and $MoF_6$.

References Cited

UNITED STATES PATENTS

| | | | |
|---|---|---|---|
| 3,062,638 | 11/1962 | Culbertson et al. | 75—0.5 |
| 3,177,067 | 5/1965 | Nichols | 75—0.5 |

DAVID L. RECK, *Primary Examiner.*

W. W. STALLARD, *Assistant Examiner.*